(12) United States Patent
Matheson (10) Patent No.: US 7,574,329 B1
(45) Date of Patent: Aug. 11, 2009

(54) OBJECT MODEL FOR DECISION AND ISSUE TRACKING

(75) Inventor: Dan M. Matheson, Fort Collins, CO (US)

(73) Assignee: Parametric Technology Corporation, Needham, MA (US)

( * ) Notice: Subject to any disclaimer, the term of this patent is extended or adjusted under 35 U.S.C. 154(b) by 1667 days.

(21) Appl. No.: 09/680,604

(22) Filed: Oct. 6, 2000

(51) Int. Cl.
*G06F 17/50* (2006.01)
*G06F 9/44* (2006.01)

(52) U.S. Cl. .......................... 703/1; 717/104; 717/108
(58) Field of Classification Search ............. 700/97–98, 700/118, 182; 707/103 R, 103 Z, 1; 717/104, 717/108
See application file for complete search history.

(56) References Cited

U.S. PATENT DOCUMENTS

| | | | | |
|---|---|---|---|---|
| 5,517,405 A | * | 5/1996 | McAndrew et al. | 706/45 |
| 5,822,206 A | * | 10/1998 | Sebastian et al. | 700/97 |
| 5,842,195 A | * | 11/1998 | Peters et al. | 707/1 |
| 5,930,764 A | * | 7/1999 | Melchione et al. | 705/10 |
| 6,295,513 B1 | * | 9/2001 | Thackston | 703/1 |
| 2002/0012007 A1 | * | 1/2002 | Twigg | 345/677 |
| 2005/0228703 A1 | * | 10/2005 | Eichstaedt et al. | 705/7 |
| 2006/0265496 A1 | * | 11/2006 | Freitag | 709/224 |

* cited by examiner

*Primary Examiner*—Paul L Rodriguez
*Assistant Examiner*—Dwin M Craig
(74) *Attorney, Agent, or Firm*—Lahive & Cockfield, LLP (57) ABSTRACT

A decision tracking object model and interface which captures and stores questions, answers, and decisions, along with their associated relationships, in an object model database is presented. Each object model includes information and relationships that are accessible via a publicly defined interface. In one embodiment, when an object model is saved to the object model database, the question, answer, and decision objects making up the object model, along with their relationships to other objects, are saved in separate relational database files. Because the question, answers, and decision objects are stored in a tool neutral persistent form, any application can access the information contained in those objects.

15 Claims, 6 Drawing Sheets

| 410 | Decision ID 501 | Decision 502 | Date 503 | Responsible Party 604 | History 505 | Decision Reason 506 |
|---|---|---|---|---|---|---|
|  |  |  |  |  |  |  |
|  |  |  |  |  |  |  |
|  |  |  |  |  |  |  |
|  |  |  |  |  |  |  |

FIG. 5

| 420 | Decision ID 601 | Question ID 602 | Question 603 | Responsible 604 | Details 605 | Date Answered 606 |
|---|---|---|---|---|---|---|
|  |  |  |  |  |  |  |
|  |  |  |  |  |  |  |
|  |  |  |  |  |  |  |
|  |  |  |  |  |  |  |

FIG. 6

| 440 | Question ID 701 | Answer ID 702 | Summary 703 | Answer Date 704 | Responsible 705 | Answer 706 |
|---|---|---|---|---|---|---|
|  |  |  |  |  |  |  |
|  |  |  |  |  |  |  |
|  |  |  |  |  |  |  |
|  |  |  |  |  |  |  |

OBJECT MODEL FOR DECISION AND ISSUE TRACKING

FIELD OF THE INVENTION

The present invention pertains generally to information management, and more particularly to a system and method for capturing, storing, and tracking issues and decisions made during the development of a product.

BACKGROUND OF THE INVENTION

Product development is assisted by computer based applications, including word processing and graphics tools, scheduling tools, and product data management tools, among others. The typical product development cycle begins with an idea for a product or an improvement to a product that addresses a need in the industry or provides a solution to a problem. From the product idea, alternative designs may be explored, and ultimately, a design is chosen, designed, and implemented. During the initial phases of the product development cycle, word processing, graphics, and scheduling tools are often used to capture information such as marketing analyses, projected development schedules, and descriptions and reasonings behind particular design choices. During the design phase, information related to the design, such as the design specifications and 3-D model data, are typically captured using a CAD tool. During production of the product, part-tracking information is typically captured using a Product Data Management (PDM) tool. During every phase of the product development cycle, issues and decisions are made.

While it is clear that various computer-based tools assist in capturing information and tracking the progress of a product, the current state of the art remains problematic. First, no tool currently exists for specifically capturing and tracking idea questions, answers, and decisions associated with all phases of the product development cycle. Exploration of ideas is often a situation where many questions and issues are presented, and resulting answers or solutions are presented, and often ultimately resulting in decisions. In order to successfully track such exploration, it is necessary to capture many only partially completed information structures, including questions raised, proposals for solutions, answers to the questions, decisions made, including the decisions to continue or abandon a path of exploration, and the rationale behind these decisions. In the prior art, no single tool exists for capturing and tracking such information. Furthermore, even if some of the information is captured using one or more different tools, because the information is not integrated into one application or easily accessible except using the particular tool that captured the information, much of the information relating to the design choices and decision rationales, as well as the issues and proposals that were explored during the development of the product, is typically not effectively captured, and may even become lost as the development cycle of the product progresses.

In addition, in the current state of the art, all design-related information that is captured using a particular computer-based tool, is typically stored, owned, and retrieved only via the tool used to create the data. There are many reasons why it would be advantageous to have the ability to access the data created by one tool using different tools. In particular, the information captured using one tool may be useful to various people from various entities performing various roles. For example, certain information captured during the design of a product may be useful not only to the design engineers, but to the manufacturing and testing engineers, managers of the product generation process, service technicians, marketing and sales personnel, order processing personnel, web site designers and administrators, customers, and suppliers, to name a few.

Accordingly, a need exists for a way to capture, store, and track issues and decision information including questions posed and answers on which decisions are or are not based and the rationale behind the decisions. A need also exists for capturing this information in a tool neutral form that allows any tool to access (and modify where appropriate) the issue/decision information. Such a tool would allow one to track the gradual development of the design and decisions about the design over the evolution of the product, thereby capturing and allowing tracking of the functional "as-designed" aspects of a product rather than at most the "as-built" configurations of the end product that the prior tools tend to capture.

SUMMARY OF THE INVENTION

The present invention is a system and method for capturing, storing, and tracking decision/issue information in a tool neutral persistent form which allows access to the data by any tool via a publicly defined interface. The invention captures the clear incremental build-up of information leading to decisions, including issues, questions, and answers explored during the product development process.

The present invention preferably includes a Decision Tracking object model which captures and stores various object models containing articles of information and their associated relationships in an object model database. Each object model includes information and relationships that are accessible via a publicly defined interface. In one embodiment, when an object model is saved to the object model database, various types of articles of information contained in the object model, along with their relationships to other articles of information, are saved in separate relational database files associated with the articles of information. Applications accessing the object model database merely use the defined object model interface, which results in the automatic separation and storage of data type objects in a tool neutral persistent form.

The Decision Tracking object model interface allows the capturing of separate question, answer, issue, and decision objects. It also provides an hierarchical structure which may associate questions with other objects to reflect the fact that one question often leads to multiple follow-on questions with associated answers.

The invention also facilitates sophisticated queries on the object models to extract interesting information from the totality of stored information. The invention is advantageous for many reasons, including the ability for multiple people with different roles to access and extract the information in ways that are meaningful to their role.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

Figure 1:
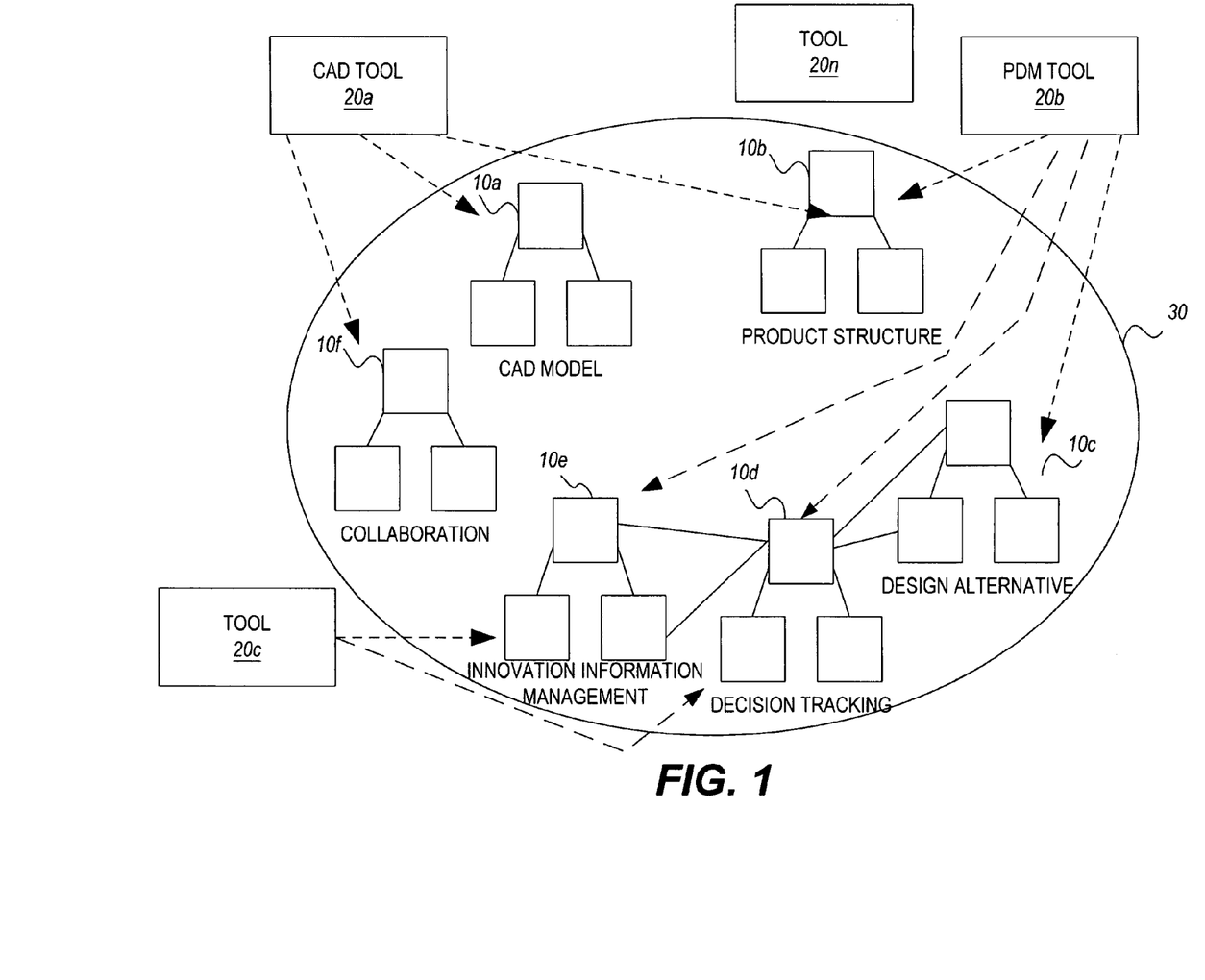
FIG. 1 is a conceptual object model diagram illustrating the separation of articles of information and their associated relationships to other articles of information.

FIG. 1 is a conceptual block diagram illustrating the separation of articles of information and their associated relationships to other articles of information, illustrating the accessibility of the information by various tools. In particular, a collection of object models $10a$, $10b$, $10c$, $10d$, $10e$, $10f$ describing information and object relationships created by a variety of different tools $20a$, $20b$, $20c$, ..., $20n$ during the development of a product are stored in a tool neutral form in persistent storage 30. Importantly, the object models $10a$, $10b$, $10c$, $10d$, $10e$, $10f$ are not owned by any tool, including the tools $20a$, $20b$, $20c$, ..., $20n$ that created them. Each object model $10a$, $10b$, $10c$, $10d$, $10e$, $10f$ contains objects that have highly dependent object relationships.

The object models $10a$, $10b$, $10c$, $10d$, $10e$, $10f$ each have a defined public interface that allows any tool $20a$, $20b$, $20c$, ..., $20n$ that understands the interface definition to read and write legal data to the corresponding set of objects. Although it may be that only one application tool completely understands a single attribute (for example, a CAD tool that understands a 3D geometry and topology), the public interface definition allows virtually any tool to access parts of the object that is does understand, including its relationships with other objects. For example, the CAD tool $20a$ (e.g., SolidDesigner) creates data that is stored partly in the CAD Model object model $10a$ and partly in the Product Structure object model $10b$. It is important to note that the CAD tool $20a$ is not required to change its internal data structure or user interface; rather the CAD tool $20a$ need only have capability to understand only those objects and structure that it reads and writes (which may be accomplished using an extension that allows import/export capability, techniques of which are well-known in the art). In this example, a Product Data Management (PDM) tool $20b$ (e.g., CoCreate Software, Inc.'s WorkManager) accesses the Product Structure model $10b$ and Design Alternative model $10c$. Accordingly, the PDM tool $20b$ must have capability for handling changes made to the Product Structure model $10b$ made by the CAD tool $20a$, and likewise, the CAD tool $20a$ must have the capability of handling changes made to the Product Structure model $10b$ by the PDM tool $20b$. The common object model (i.e., Product Structure model $10b$) that they understand thereby enhances the collaboration between the CAD tool $20a$ and PDM tool $20b$.

It is also important to note that other tools (e.g., $20n$) can also access the object models $10a$, $10b$, $10c$, $10d$, $10e$, $10f$ at any time, and the collection of object models $10a$, $10b$, $10c$, $10d$, $10e$, $10f$, can be expanded at any time. Accordingly, the collection of information and relationships with other objects expands and evolves over the course of the product cycle, capturing the "as-designed" aspects of the product. In addition, the tool neutral persistent form of the object models allow both synchronous and asynchronous collaboration of the product development by allowing many different people (e.g., engineers, management, administrative personnel, and even customers) with appropriate permissions to access the data contained in the object models, which represents the current state of the product.

Among the object models in the object model database 30 is a Decision Tracking object model $10d$, which encapsulates the information associated with tracking questions, answers, issues, and resulting decisions, and their relationships both to other objects in the Decision Tracking object model $10d$ and to objects in other object models $10a$, $10b$, $10c$, $10d$.

Objects in the Decision Tracking object model $10d$ may be created automatically by one or more tools $20a$, $20b$, $20c$, ... $20n$, or may be specifically created by users via specific Decision Tracking dialogs accessed via the user interface of the tools. In addition, a Decision Tracking tool $20c$ may be developed for specifically entering decision-tracking data. However, as noted above, no tool has ownership of the data in the Decision Tracking object model $10d$, and any tool can access the data in the Decision Tracking object model $10d$ via publicly defined interfaces (discussed hereinafter) associated with the Decision Tracking object model $10d$.

Figure 2:
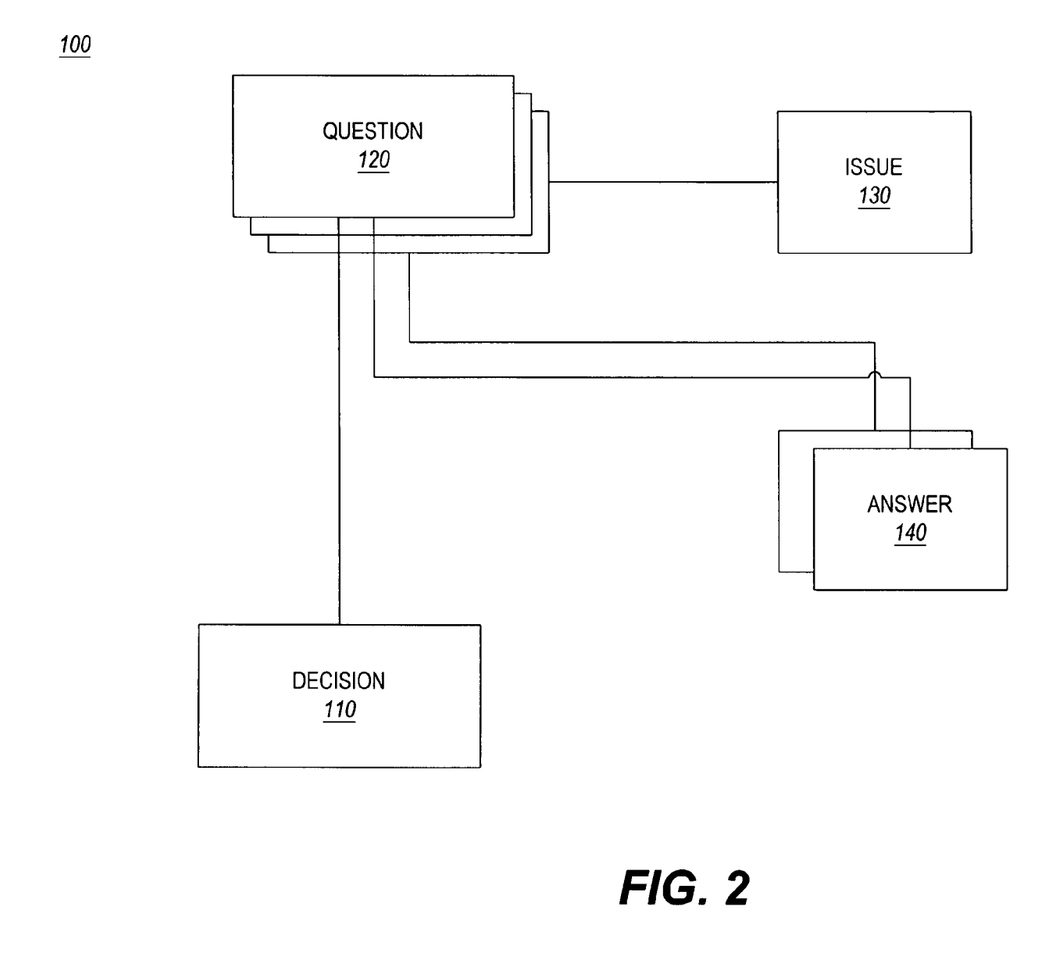
FIG. 2 is a block diagram of Decision Tracking object model implemented in accordance with the invention.

FIG. 2 is a block diagram illustrating a preferred embodiment 100 of the Decision Tracking object model $10d$ of FIG. 1, which provides an object model for capturing and storing the pieces and structure of information associated with making a design decision in a tool neutral persistent form.

As illustrated in FIG. 2, the major articles of information in the Decision Tracking object model 100 include the objects: Decision object 110, Question object 120, Design Issue object 130, and Answer object 140.

A Decision object 110 encapsulates a design decision about an aspect of a product. Various types of Decisions may be defined that are specific to a particular design aspect.

A Question object 120 encapsulates a question which may or may not be relevant to the formation of a design decision that is encapsulated by a Decision object 110.

A Design Issue object 130 encapsulates a design issue that may be addressed by posing questions and obtaining answers to those questions, which ultimately lead to a design decision.

An Answer object 140 encapsulates an answer to a question encapsulated in a Question object 120.

Within the Decision Tracking object model 100, there exist relationships between the objects, as illustrated by the connecting lines between the objects. For example, each Question object 120 may have associated with it only one Decision object 110, while a Decision object 110 may be determined by the answers to many questions (which are encapsulated in a plurality of Question objects 120). Each Answer object 140 may be associated with only one Question object 120.

Figure 3:
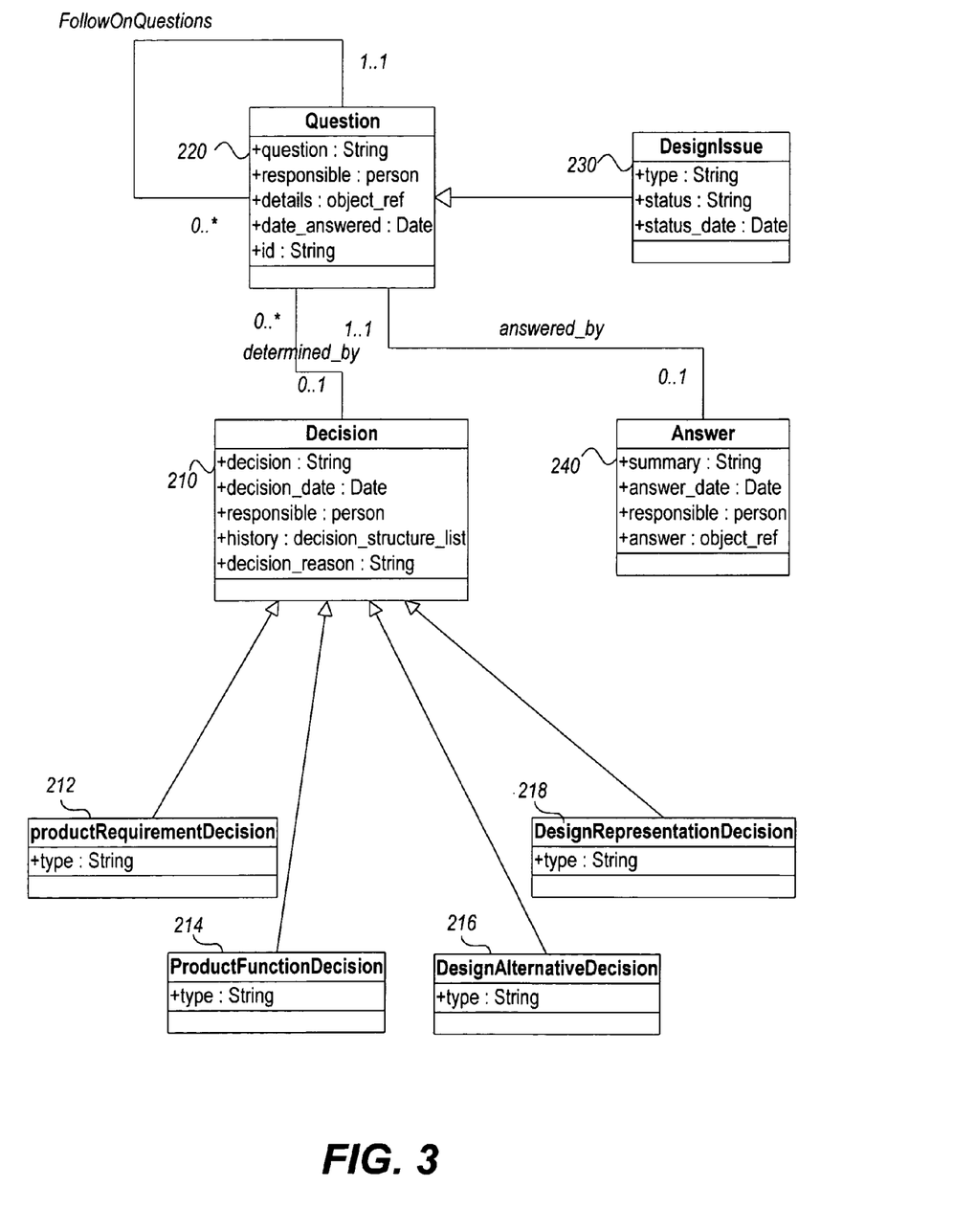
FIG. 3 is a UML interface diagram illustrating a preferred embodiment of the Decision Tracking object model interface for the Decision Tracking object model shown in FIG. 2.

FIG. 3 is a UML interface diagram illustrating a preferred embodiment of the Decision Tracking object model interface for the Decision Tracking object model 100 of FIG. 2. As illustrated in FIG. 3, the public interfaces defined for the Decision Tracking object model 200 of FIG. 2 include: Decision object 110, Question object 120, Design Issue object 130, and Answer object 140. The attributes for each interface are as displayed in FIG. 3.

In the Decision Tracking interface definition, information about a decision is encapsulated in a Decision object 110

(FIG. 2) accessed using the Decision 210 interface. In this embodiment, the Decision interface 210 may be extended to be specific to a certain type of design decision. In the illustrative embodiment, the Decision interface 210 is extended to provide a ProductRequirementDecision interface 212, a ProductFunctionDecision 214, a DesignAlternativeDecision 216, and a DesignRepresentationDecision interface 218. ProductRequirementDecision interface 212 is used specifically to capture decisions related to product requirements. ProductFunctionDecision 214 is used specifically to capture the decisions related to a function of a product. DesignAlternativeDecision 216 is used specifically to capture decisions related to a particular design alternative of a product. DesignRepresentationDecision interface 218 is used specifically to capture decisions related to a particular representation of a product.

The Question interface 220 may also be extended to provide an interface DesignIssue 230 for encapsulating a design issue. As also illustrated, the Question interface 220 may also provide access to follow-on questions encapsulated in associated Question objects 120.

This ability to capture questions, associated answers, issues, and decisions, along with their relationship to one another allows a user or application to query the system asking important questions, and automatically receiving the feedback from the Decision Tracking object model. For example, the Decision Tracking object model may be queried for all questions, and their associated answers, that are associated with a particular decision. This type of query would allow an interested party to understand how a particular decision was reached. Alternatively, a particular design issue that was encountered in one product may be searched for and then all questions, associated answers, and associated decisions associated with the design issue retrieved to obtain a solution to the same problem that is encountered in a new product.

The interfaces defined in the UML diagram of FIG. 3 are preferably implemented in an object-oriented language such as C++ or Java2. The actual class implementation may vary from system to system, since it will often make sense to combine some of the interfaces into a single class for efficiency of implementation and/or performance.

Figure 4:
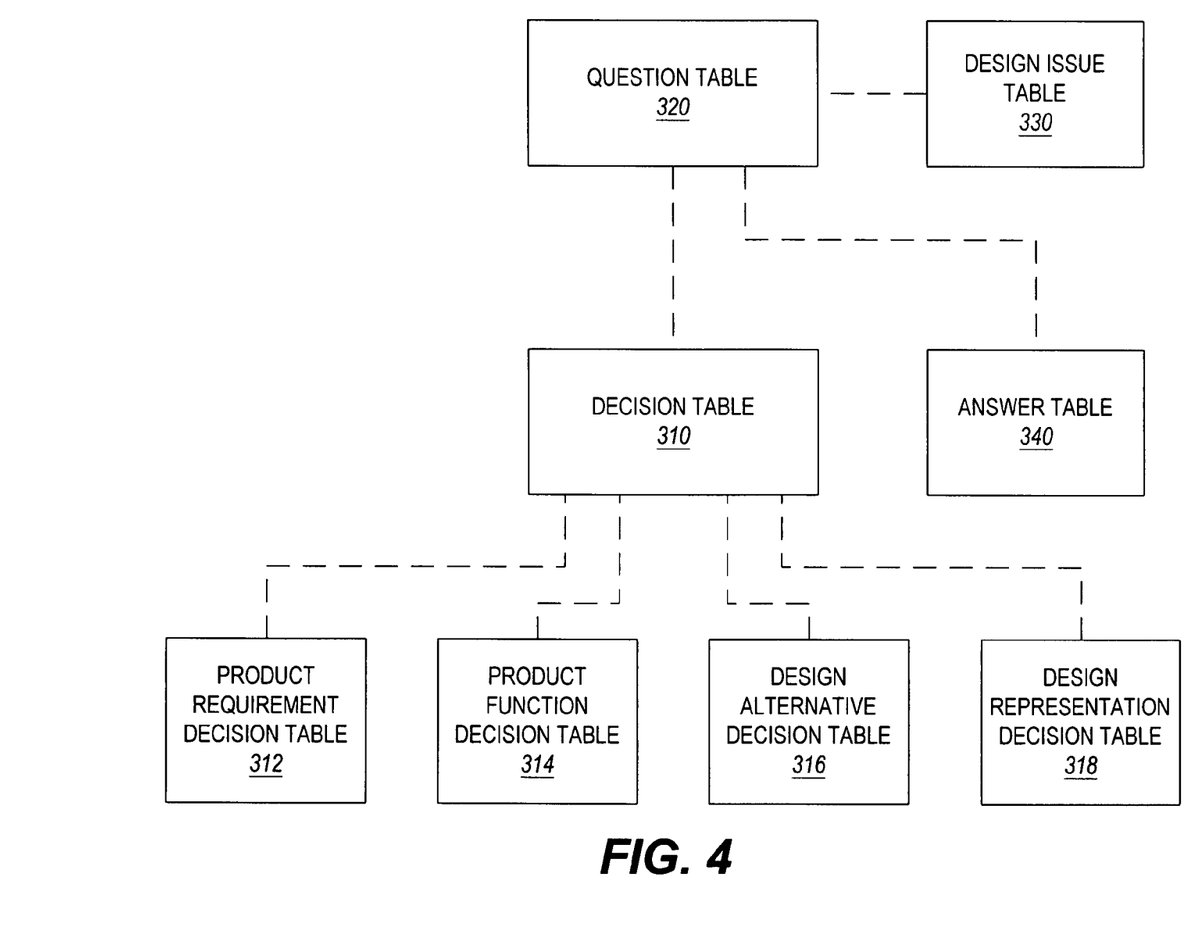
FIG. 4 is a block diagram of the persistent storage entities generated and maintained by the Decision Tracking object model of FIG. 2 using the interfaces defined in FIG. 3.

FIG. 4 is a block diagram illustrating one embodiment of the persistent storage entities generated and maintained by the Decision Tracking object model 100 of FIG. 2 using the interfaces defined in FIG. 3. In this embodiment, each of the interfaces has associated with it a persistent storage file, preferably in the form of a relational database. The data encapsulated using each respective interface is stored in its respective relational database file. Accordingly, there is a separate relational database file for each defined interface. In the illustrative embodiment, a Decisions table 310 stores all data accessed using the Decisions interface 210, Questions table 320 stores all data accessed using the Question interface 220, Design Issue table 330 stores all data accessed using the DesignIssue interface 230, Answers table 340 stores all data accessed using the Answer interface 240, and decision tables Product Requirement Decision table 312, Product Function Decision table 314, Design Alternative Decision table 316, and Design Representation Decision table 318 each respectively store all data accessed using the interfaces ProductRequirementDecision 212, ProductFunctionDecision 214, DesignAlternativeDecision 216, and DesignRepresentationDecision. The dashed lines connecting the various tables represents a foreign key (i.e., a common column in each connected relational database) used to represent relationships between data stored in the tables.

Figure 5:
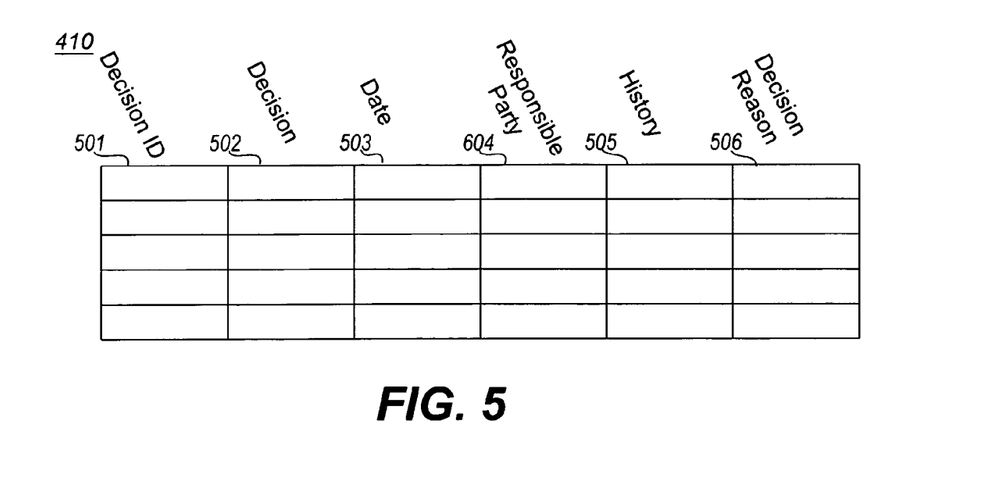
FIG. 5 is an illustrative example of a relational database file implementing a Decision table in accordance with the invention.

FIG. 5 is an illustrative example of a relational database file 410 implementing a Decision table 310. As illustrated, each column 502, 503, 504, and 505 maps to an attribute encapsulated by the Decision interface 210. Each row maps to a different Decision object 110. A Decision ID in column 501 is also associated with each decision and used as the primary key (which is unique across the Decisions table 410) for ease of searching.

Figure 6:
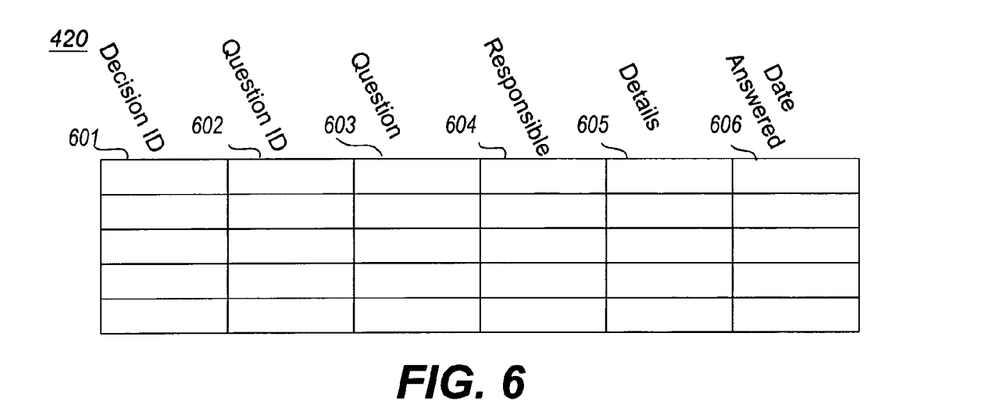
FIG. 6 is an illustrative example of a relational database file implementing a Question table in accordance with the invention.

FIG. 6 is an illustrative example of a relational database file 420 implementing a Questions table 320. Again, each column 602, 603, 604, 605, and 606 respectively maps to an attribute encapsulated by the Question interface 220 and each row maps to a different Question object 120. In this example, the primary key (i.e., a unique identifier across the file) for each Question object 120 is its Question ID (in this embodiment stored in column 602). The Decision ID of the Decision object that is associated with the Question is used as the foreign key; accordingly a foreign key column 601 is provided to store the Decision ID which maps respective Question objects to their associated Decision objects (if an association exists).

Figure 7:
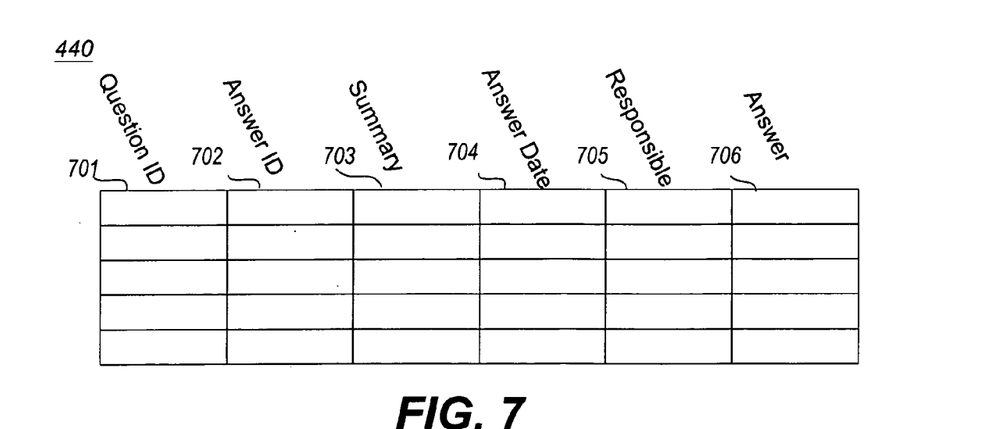
FIG. 7 is an illustrative example of a relational database file implementing an Answer table in accordance with the invention.

FIG. 7 is an illustrative example of a relational database file 440 implementing an Answers table 340. In this example, the Question ID attribute of the Question object that is associated with the Answer object 140 is used as the foreign key; accordingly a foreign key column 701 is provided to store the Question ID to map respective Answer objects to their associated Question objects.

The other tables illustrated in FIG. 4 are implemented in relational databases files similar to those illustrated in FIGS. 5-7.

The methods by which certain decision tracking data is captured varies according to the type of data captured. Data may be captured when a user manually enters the data via a user interface dialog (for example, when a user enters a decision or question and associated answers using a Decision Tracking dialog in the application's user interface), or may be created automatically by an application (for example, attributes such as object identifiers, Date Answered or History may be automatically created or captured by the application at the time an article of information is captured or modified).

Figure 8:
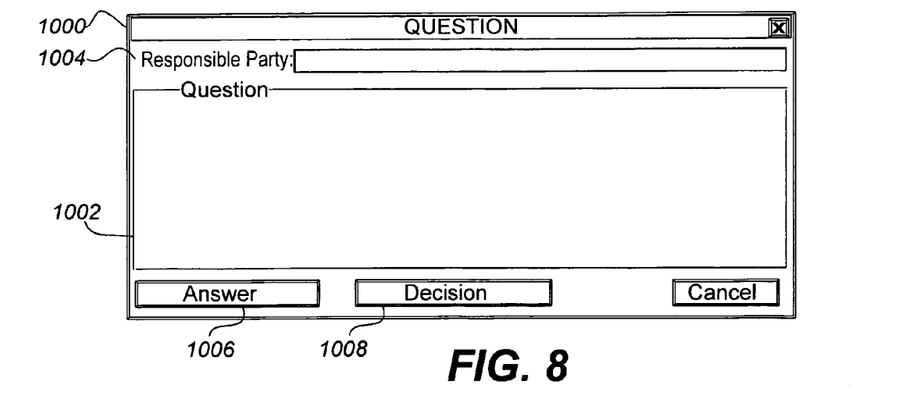
FIG. 8 is a Question dialog for a graphical user interface implemented in accordance with the invention.
Figure 9:
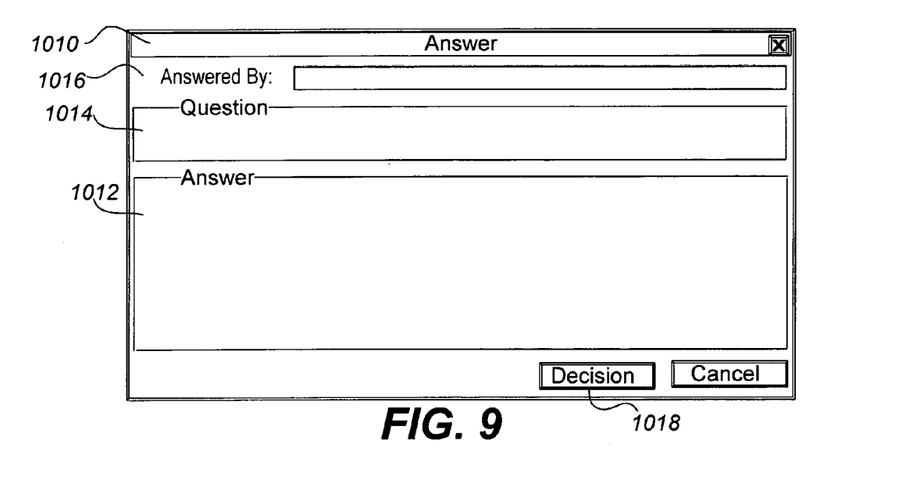
FIG. 9 is a Answer dialog for a graphical user interface implemented in accordance with the invention.

FIG. 8 is an example Question dialog 800 of a graphical user interface for a generic application that has the capability for accessing and creating a Decision Tracking object model 10d in accordance with the invention. As illustrated, the Question dialog 800 includes user capabilities to enter a question 802 and a name 804 for optionally entering a person or entity responsible for answering the question. The Question dialog 800 also includes user capabilities (i.e., buttons 806 and 808) for respectively entering an answer and/or decision relating to the question. In particular, if the user clicks on the Answer button 1006, an Answer dialog 1010, illustrated in FIG. 9, pops up. As illustrated in FIG. 9, the Answer dialog 1010 displays a frame 1014 containing the question to be answered (which is preferably not editable) and allows the user to enter an answer 1012 to the question displayed in frame 1014. Preferably, the answer dialog 1010 also allows the user to enter the name 1016 of the party answering the question.

Figure 10:
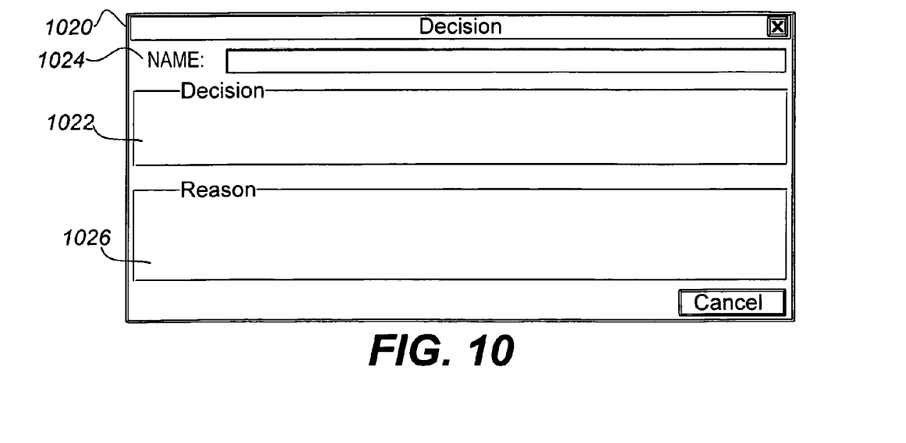
FIG. 10 is a Decision dialog for a graphical user interface implemented in accordance with the invention.

User capability for entering a Decision to the answered question may be accessed by clicking on a Decision button 1018, which pops up a Decision dialog 1020, illustrated in FIG. 10. This same dialog is accessed by clicking on the Decision button 1008 of the Question dialog shown in FIG. 8. As illustrated in FIG. 10, the user may fill in a description 1022 of the decision and name 1024 of the party making the decision, and optionally a decision reason 1026. Preferably, the underlying object code automatically generates a decision date and captures the decision in a history list.

Similar dialogs may be implemented to capture design-specific issues, product requirement decisions, product function decisions, design alternative decisions, and design representation decision.

As described in detail above, the invention provides a novel way of capturing, storing, accessing, and tracking questions, answers, issues, and decisions. The Decision Tracking object model of the invention allows the capture of the incremental build-up of decision exploration data including questions, answers, and decisions relating to product issues, alternative design proposals, product requirements, and product functions that are explored during the development of a product. The decision tracking information is represented in a form that may be accessed and presented in different ways using various computer-based applications.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for constructing a decision tracking object model for handling an issue related to a design of a product using computer system that enables collaboration between a plurality of users, the method performed in a computer system and comprising:
   providing a question object, an answer object, a decision object, and a design issue object, wherein each of the question object, the answer object, the decision object, and the design issue object encapsulates at least one article of information and at least one relationship to another object;
   encapsulating a question related to the issue as an article of information in the question object;
   encapsulating an answer related to the question as an article of information in the answer object;
   encapsulating a decision made based on the answer as an article of information in the design issue object;
   encapsulating the issue related to the design of the product as an article of information in the design issue object;
   providing a decision tracking object model comprising the question object, the answer object, the decision object, and the design issue object;
   storing the decision tracking object model in an object model database on a computer readable storage medium; and
   providing at least one of the question object, the answer object, the decision object, and the design issue object to the plurality of users.

2. The method of claim 1, wherein the plurality of users interacts with at least one of the question object, the answer object, and the decision object via a graphical user interface on a display device, the users interacting with the graphical user interface using an input device.

3. The method of claim 1, wherein the storing of the question object, the answer object, and the decision object is in a tool-neutral persistent form.

4. The method of claim 1, wherein each of the question object, the answer object, and the decision object are stored in a separate relational database, the method further comprising using foreign keys to maintain associations between each of the question, the answer, and the decision.

5. The method of claim 1, further comprising storing at least one association between at least one of the issue object, the question object, the answer object, and the decision object, and another of the issue object, the question object, the answer object, and the decision object.

6. The method of claim 5, wherein storing at least one association comprises storing an association of the question object with the decision object along with the question object.

7. The method of claim 5, wherein storing at least one association comprises storing an association of the answer object with the question object along with the answer object.

8. The method of claim 5, wherein storing at least one association comprises storing an association of the decision object with the answer object along with the decision object.

9. The method of claim 5, wherein storing at least one association comprises storing an association of the issue object with the question object.

10. The method of claim 5, wherein there are a plurality of questions related to the issue and a plurality of answers related to the plurality of questions.

11. The method of claim 10, further comprising storing an association for each answer of the plurality of answers that indicates that each answer of the plurality of answers is associated with only one question of the plurality of questions.

12. The method of claim 11, further comprising storing an association for each question of the plurality of questions that indicates that each question of the plurality of questions is associated with the issue.

13. The method of claim 10, further comprising storing an association for each question of the plurality of questions that indicates that each question of the plurality of questions is associated with the decision.

14. The method of claim 1, wherein at least a part of the question object, the answer object, the design issue object, or the decision object is read or written by a Computer Aided Drafting tool.

15. The method of claim 1, wherein the decision relates to one of the group of a product requirement, a product function, a product design alternative, and a product representation.

* * * * *